United States Patent Office 3,528,996
Patented Sept. 15, 1970

3,528,996
STABILIZED TETRAHYDROPHTHALIC
ANHYDRIDE
Bernard Taub, Williamsville, N.Y., assignor to Allied
Chemical Corporation, New York, N.Y., a corporation
of New York
No Drawing. Filed Apr. 26, 1968, Ser. No. 724,604
Int. Cl. C07c 61/24
U.S. Cl. 260—346.3     7 Claims

ABSTRACT OF THE DISCLOSURE

Liquid isomeric mixtures of cyclohexene-1,2-dicarboxylic anhydride (tetrahydrophthalic anhydride), useful as curing agents for epoxy resins, may be stabilized and made resistant to deposition of solids by the addition of a small amount of a di-lower alkyl acetamide, especially dimethylacetamide.

Epoxy resins and methods of curing them are well known and have been extensively described in the literature. Typical commercially available epoxy resins are prepared by reacting a polyhydroxy compound, such as 2,2-bis (4-hydroxy-phenyl) propane, with a polyfunctional halohydrin, such as epichlorohydrin. By reaction with a curing agent, the epoxy resins are converted into thermoset materials having excellent mechanical, chemical and electrical properties. Details of the preparation and curing of epoxy resins are described in such references as "Epoxy Resins, Their Application and Technology," McGraw-Hill Book Co., Inc. (1957).

It is known that carboxylic acids and in particular, cyclohexene-1,2-dicarboxylic anhydride, commonly referred to as tetrahydrophthalic anhydride, are useful as curing agents for epoxy resins. Tetrahydrophthalic anhydride, commonly prepared by the condensation of butadiene and maleic anhydride, is a relatively inexpensive anhydride which imparts excellent physical properties to epoxy resins. However, in its common form, the $\Delta$-4 isomer (M.P. 103° C.), tetrahydrophthalic anhydride is a solid at room temperature and is only partially soluble in liquid epoxy resins at room temperature. As a result, in order to achieve suitable mixing with the resin, it is generally necessary to melt the anhydride and to maintain it at elevated temperature during the mixing. When operating in this manner, the resin-anhydride mixture has a relatively short "pot life," due to the elevated temperatures used in preparing the mixture. Accordingly, there is a need in the art for liquid anhydride curing agents which would permit mixtures of the anhydride and epoxy resin to be prepared at room temperature without heating, thus extending the "pot life" of the mixture to be cured.

There has been much investigation in recent years of methods of making such liquid tetrahydrophthalic anhydrides. A partial solution to the problem has been found in the use of techniques whereby the $\Delta$-4 isomer of tetrahydrophthalic anhydride is converted to a mixture of isomers which remains liquid at temperatures substantially below the melting point of the $\Delta$-4 isomer. Various processes for the isomerization of tetrahydrophthalic anhydride to such isomeric mixtures which are liquid at or near room temperatures are disclosed in the prior art, for example, British Pat. 914,463 and U.S. Pats. 2,764,597 and 2,959,599; as well as in application of C. S. Cheng et al., Ser. No. 637,090, filed May 9, 1967. The isomeric mixtures prepared by any of these procedures are excellent curing agents for epoxy resins and offer the advantage of being normally liquid at about room temperature. However, it has been found that when these liquid isomeric mixtures are stored for extended periods under ambient conditions, a deposition of solids occurs and the previously clear liquid becomes cloudy and the solids settle out. While the exact nature of the deposited solids is not known with certainty, it is believed that a major proportion results from the precipitation of the $\Delta$-1 isomer. These solids may be redissolved by heating, e.g. to about 120° C.; however, on cooling to room temperature and subsequent storage, the phenomenon recurs. Although this deposition of solids does not materially alter the properties of the anhydride mixture with respect to its ability to cure epoxy resins, it does necessitate the inconvenient and uneconomical step of heating or agitating the mixture to redissolve the solids before use or transfer in order to maintain a uniform mixture.

It is therefore an object of the present invention to provide normally liquid isomeric mixtures of tetrahydrophthalic anhydride which are stable for extended periods of time.

Another object is to provide a method of stabilizing liquid isomeric mixtures to tetrahydrophthalic anhydride.

These and other objects and advantages of the present invention will be apparent from the disclosure which follows.

We have discovered that novel compositions comprising isomeric mixtures of tetrahydrophthalic anhydrides, which mixtures are stable homogeneous liquids at about 15° to 25° C., can be obtained by incorporating into a mixture of the isomers of tetrahydrophthalic anhydride, a small but stabilizing amount of a dialkyl acetamide wherein the alkyl groups contain from one to four carbon atoms.

The dialykyl acetamides which can be used in the compositions of this invention include dimethylacetamide, diethylacetamide, dipropylacetamide, dibutylacetamide, methylisopropylacetamide, methylethylacetamide, methyl-n-butylacetamide and the like. Because of its low cost and ready availability, the preferred dialkylacetamide is dimethylacetamide.

The stabilizing amount of the dialkyl acetamide which is added to the liquid isomeric mixture of tetrahydrophthalic anhydride may vary considerably, a degree of stabilization being obtainable even from the addition of relatively minute amounts. It is preferred, however, in order to stabilize against deposition under relatively extreme conditions, to employ between about 0.1 and about 4.0% and especially between about 0.5 and 1.5%, by weight, of the stabilizer based on the weight of the isomeric mixture of tetrahydrophthalic anhydride. Inasmuch as the dialkyl acetamide is not a reactive constituent when the composition is used as a curing agent for epoxy resins, amounts in excess of about 4.0% may result in a breakdown of the physical properties of the resin and thus are not recommended.

The liquid tetrahydrophthalic anhydride compositions, which are stabilized in accordance with the present invention, are isomeric mixtures and thus do not exhibit a definite melting or freezing point. The solidification or melting of such a mixture takes place over a range of temperatures and is affected by the distribution of isomers in the mixture. Because of the absence of a definite melting point, it is more meaningful to consider these mixtures in terms of a "clear point," that is, the temperature above which no solids are observed. This clear point is determined by gradually heating a composition containing undissolved solids and observing the temperature at which the composition becomes clear. In the preparation of the liquid isomeric mixtures as described in the above-cited prior art references, the distribution of isomers, and thus the clear point of the mixture, will vary depending on the conditions of isomerization, such as the isomerization reaction time.

The novel stabilized anhydride compositions of the invention may be prepared using a variety of isomeric mixtures. However, the stabilizing effect achieved in accordance with the present invention finds greatest utility when applied to isomeric mixtures having a clear point considerably below the melting point of the Δ-4 isomer of tetrahydrophthalic anhydride (about 103° C.), for example, with mixtures having a clear point below about 50° C. Such compositions will generally be characterized by an isomer distribution within the following range:

| Isomer: | Percent by wt. |
|---|---|
| Δ-4 tetrahydrophthalic anhydride | 5–35 |
| Δ-3 tetrahydrophthalic anhydride | 5–65 |
| Δ-2 tetrahydrophthalic anhydride | 0–25 |
| Δ-1 tetrahydrophthalic anhydride | 0–90 |

Preferred isomeric compositions to be employed in accordance with the procedure of the present invention are those having a clear point below about 25° C.; such compositions will generally be characterized by an isomer distribution wtihin the following range:

| Isomer: | Percent by wt. |
|---|---|
| Δ-4 tetrahydrophthalic anhydride | 5–15 |
| Δ-3 tetrahydrophthalic anhydride | 30–55 |
| Δ-2 tetrahydrophthalic anhydride | 10–25 |
| Δ-1 tetrahydrophthalic anhydride | 5–45 |

The preparation of the novel compositions of this invention can be carried out in a very simple manner, merely by dissolving the desired amount of dialkyl acetamide in the liquid isomeric anhydride mixture. Generally, elevated temperatures in the range of about 40° C. to about 150° C. are employed to assure complete dissolution of the solids present. The precise temperature will depend on the solubility of the particular dialkyl acetamide employed and the amount and character of the solids, if any, present in the particular isomeric mixture.

Thus we have discovered that by incorporating a small amount of a dialkyl acetamide, preferably dimethylacetamide, into isomeric mixtures of tetrahydrophthalic anhydrides, said mixtures can be converted from metastable or heterogeneous liquid compositions from which solids would settle out on standing to stable homogeneous liquid compositions containing no deposited solids which remain in such homogeneous liquid form at temperatures in the range 15° C. to 25° C., and particularly at ordinary room temperatures, for long periods of time, i.e. at least about sixty days. The stabilized compositions of the present invention are thus characterized by substantially improved storage stability. They are also characterized by improved resistance to deposition of solids under adverse storage conditions such as low temperatures and subjection to freeze-thaw cycles. As employed herein, a freeze-thaw cycle consists in holding a 100 gram mass of the compositions to be tested at below −10° C. until it becomes solid throughout, then allowing it to warm to room temperature; a composition is considered to have undergone a successful freeze-thaw cycle if it reverts to a completely homogeneous liquid phase on standing for about 24 hours at about 20° to 30° C.

In addition to being stabilized against the deposition of solids, the liquid anhydride composition of the present invention are readily miscible with epoxy resins at or near ordinary room temperatures. After the epoxy resin has been mixed with a curing composition of the invention, the mixture may be poured in any mold of suitable dimensions, in which it is cured to a hard resinous structure upon heating in the conventional manner. The cured epoxy resins thus produced exhibit excellent chemical and physical properties.

The stabilized tetrahydrophthalic anhydride compositions of the present invention may be used to cure any of the commercially available epoxy resins containing either internal or terminal epoxy groups. The amount of the anhydride employed as a curing agent may vary considerably. Generally, satisfactory cures are obtained when the anhydride curing agent is added to the epoxy resin in an amount of between about 10 to 80% by weight based on the weight of the epoxy resin; however, the precise amount used is governed by the particular combination of physical properties desired in the cured product.

The following examples described specific embodiments of the invention and illustrate the best method contemplated for carrying it out; but they are not to be interpreted as limiting the invention to all the details thereof, since changes can be made without departing from the scope of the invention. In the examples, unless otherwise indicated, all parts and percentages are by weight and all temperatures are in centigrade degrees.

EXAMPLE I

Preparation of liquid isomeric mixture of cyclohexene-1,2-dicarboxylic anhydride A mixture of 199 parts of Δ-4-cyclohexene-1,2-dicarboxylic anhydride and 1 part of m-benzene-disulfonic acid was heated at 193° to 199° for a period of 14 hours. The reaction mixture was then distilled at 3.0 to 3.5 millimeters of mercury at 119° to 141° to yield 184.1 parts of liquid isomeric cyclohexene-1,2-dicarboxylic anhydrides. The liquid product, solidified by cooling to 0°, had a clear point at 22° C. and an isomeric distribution as follows:

| Isomer: | Percent by wt. |
|---|---|
| Δ-1 tetrahydrophthalic anhydride | 40.0 |
| Δ-2 tetrahydrophthalic anhydride | 15.6 |
| Δ-3 tetrahydrophthalic anhydride | 36.0 |
| Δ-4 tetrahydrophthalic anhydride | 8.4 |

EXAMPLE II

Stabilization

After an extended storage period during which a deposition of solids was observed in the liquid cyclohexene-1,2-dicarboxylic anhydride prepared as in Example I, one hundred parts of the anhydride was intimately mixed with 1 part of dimethylacetamide and the mixture was heated to 120° C. and maintained thereat for a period of one hour to insure the complete dissolution of the solids present. A sample of the stabilized mixture was then stored at room temperature. No deposition of solids occurred in the treated sample after two months of storage.

A control sample of the same liquid cyclohexene-1,2-dicarboxylic anhydride to which no dimethylacetamide had been added was similarly heated to 120° and maintained thereat for a period of one hour to insure complete dissolution of the solids present and thereafter stored at room temperature. A deposition of solids was observed in the untreated control sample after a storage period of one week.

In a further evaluation of stability, a sample of the liquid cyclohexene-1,2-dicarboxylic anhydride containing 1% of the dimethylacetamide additive was subjected to freeze-thaw cycles by cooling to −30° and then warming to room temperature of 25°. The stabilized sample remained clear even after seven freeze-thaw cycles.

II to VII. The physical properties of the cured resins are shown in the table below:

| Compositions of Example No. | Stabilized Compositions | | | | | | Non-Stabilized Control Samples | | |
|---|---|---|---|---|---|---|---|---|---|
| | 2 | 3 | 4 | 5 | 6 | 7 | | | |
| Physical properties: | | | | | | | | | |
| Tensile strength (p.s.i.) | 9,000 | 8,400 | 7,700 | 11,000 | 11,100 | 10,200 | 11,500 | 12,000 | 9,300 |
| Elongation (percent) | 3.6 | 3.1 | 2.4 | 3.9 | 3.9 | 3.4 | 4.3 | 5.3 | 3.4 |
| Heat deflection temp. (degrees) | 119 | 119 | 119 | 121 | 120 | 121 | 125 | 125 | 125 |

EXAMPLES III–VII

The procedure of Example II was repeated except that in place of the particular liquid cyclohexene-1,2-dicarboxylic anhydride composition there was substituted liquid cyclohexene-1,2-dicarboxylic anhydride compositions having the various isomer distributions shown, and the amount of dimethylacetamide stabilizer was varied as shown.

| Example | III | IV | V | VI | VII |
|---|---|---|---|---|---|
| Amount of tetrahydrophthalic anhydride (parts) | 99 | 99 | 150 | 150 | 150 |
| Isomer distribution (percent): | | | | | |
| A-1 | 27.1 | 25.4 | 25.4 | 25.4 | 25.4 |
| A-2 | 22.1 | 19.5 | 19.5 | 19.5 | 19.5 |
| A-3 | 38.6 | 42.0 | 42.0 | 42.0 | 42.0 |
| A-4 | 12.1 | 12.6 | 12.6 | 12.6 | 12.6 |
| Amount of dimethylacetamide (parts) | 1.0 | 1.0 | 0.5 | 0.75 | 1.0 |

The dimethylacetamide-stabilized compositions prepared were evaluated against untreated control samples as in Example II. In the control samples a deposition of solids was noted after about 1 week of storage whereas the stabilized compositions remained clear even after two months of storage. The compositions remained clear even after seven freeze-thaw cycles.

Use as curing agent

Each of the stabilized compositions of Examples II–VII was tested for use as an epoxy curing agent in the following manner: To 140 parts of Araldite 6010, a bisphenol type of epoxy resin, were added 112 parts of stabilized liquid tetrahydrophthalic anhydride and 14.0 parts of benzyldimethylamine catalyst. The reactants were mixed, cast into molds and cured at 90° for three hours then 150° for four hours.

The procedure was repeated for each of the stabilized compositions as well as the control samples of Examples

I claim:

1. A liquid anhydride composition stabilized against the deposition of solids, said composition comprising a mixture of cyclohexene-1,2-dicarboxylic anhydride isomers and up to about 4.0 percent by weight of a dialkyl acetamide wherein the alkyl groups contain from 1 to 4 carbon atoms.

2. A composition as claimed in claim 1 wherein the dialkyl acetamide is dimethylacetamide.

3. A composition as claimed in claim 1 wherein the dialkyl acetamide is present in an amount of 0.1 to 4.0 percent by weight based on the weight of the isomeric anhydride mixture.

4. A composition as claimed in claim 3 wherein the dialkyl acetamide is present in an amount of 0.5 to 1.5 percent by weight based on the weight of the isomeric anhydride mixture.

5. A composition as claimed in claim 1 wherein the mixture of cyclohexene-1,2-dicarboxylic anhydride isomers has a clear point below about 50° C.

6. A composition as claimed in claim 5 wherein the mixture of cyclohexene-1,2-dicarboxylic anhydride isomers has a clear point below about 25° C.

7. A process for stabilizing a normally liquid mixture of cyclohexene-1,2-dicarboxylic anhydride isomers against deposition of solids at room temperature which comprises dissolving in said mixture up to about 4 percent by weight of a dialkyl acetamide.

References Cited

UNITED STATES PATENTS 3,341,555   12/1969   Wooster et al. ____ 260—346.3

ALEX MAZEL, Primary Examiner

B. I. DENTZ, Assistant Examiner